United States Patent
Pham

(10) Patent No.: US 11,178,967 B2
(45) Date of Patent: Nov. 23, 2021

(54) METHOD AND APPARATUS FOR ARTICULATED STORAGE

(71) Applicant: Cliff Pham, Paradise Valley, AZ (US)

(72) Inventor: Cliff Pham, Paradise Valley, AZ (US)

( * ) Notice: Subject to any disclaimer, the term of this patent is extended or adjusted under 35 U.S.C. 154(b) by 132 days.

(21) Appl. No.: 16/560,853

(22) Filed: Sep. 4, 2019

(65) Prior Publication Data

US 2021/0059412 A1 Mar. 4, 2021

(51) Int. Cl.
*F16M 11/00* (2006.01)
*A47B 95/00* (2006.01)
*F16M 13/02* (2006.01)
*G05B 19/042* (2006.01)
*G06F 3/0484* (2013.01)
*G06F 3/0488* (2013.01)

(52) U.S. Cl.
CPC ......... *A47B 95/008* (2013.01); *F16M 13/022* (2013.01); *G05B 19/0423* (2013.01); *F16M 2200/06* (2013.01); *G05B 2219/23377* (2013.01); *G06F 3/0488* (2013.01); *G06F 3/04847* (2013.01)

(58) Field of Classification Search
CPC . F16M 13/022; G05B 19/0423; A47B 95/008
See application file for complete search history.

(56) References Cited

U.S. PATENT DOCUMENTS

| 2,035,093 | A | * | 3/1936 | Nielsen | ................... | F16N 37/00 |
| | | | | | | 184/1.5 |
| 2,473,239 | A | | 6/1949 | Boyd | | |
| 4,789,210 | A | | 12/1988 | Weiss et al. | | |
| 4,947,089 | A | * | 8/1990 | Abel | ................... | B01F 13/1005 |
| | | | | | | 177/121 |
| 5,123,621 | A | | 6/1992 | Gates | | |
| 5,249,858 | A | | 10/1993 | Nusser | | |
| 5,706,873 | A | * | 1/1998 | Benoit | ................... | F16N 31/002 |
| | | | | | | 137/513.7 |
| 7,487,943 | B1 | | 2/2009 | Gillespie | | |
| 8,191,487 | B2 | | 6/2012 | Theesfeld et al. | | |

(Continued)

FOREIGN PATENT DOCUMENTS

| CH | 664332 A5 | 2/1988 |
| CN | 1802115 A | 7/2006 |

(Continued)

*Primary Examiner* — Amy J. Sterling
(74) *Attorney, Agent, or Firm* — Lamon Patent Services; Cynthia S. Lamon

(57) ABSTRACT

An articulated storage apparatus has a mounting plate having openings for fasteners to mount to a stable stationary surface, a first arm extending from the mounting plate, a second arm coupled at a first end to the first arm at an end away from the carrier plate by a first vertically-oriented rotation mechanism driven by a first electric motor, a carrier plate having openings for fasteners to mount to a storage container, a third arm extending from the carrier plate coupled at an end away from the carrier plate to the second arm at a second end opposite the first end by a second vertically-oriented rotation mechanism driven by a second electric motor, and a control system having independent drivers for the first and the second electric motors, with inputs for independently rotating the electric motors in opposite directions.

9 Claims, 12 Drawing Sheets

(56) References Cited

U.S. PATENT DOCUMENTS

| | | | |
|---|---|---|---|
| 9,004,430 B2 | 4/2015 | Conner | |
| 9,056,640 B2 | 6/2015 | Vineyard | |
| 9,702,397 B2* | 7/2017 | Chen | B25H 1/16 |
| 2007/0108355 A1* | 5/2007 | Li | F16M 11/08 |
| | | | 248/280.11 |
| 2009/0212184 A1 | 8/2009 | Bourgeois et al. | |
| 2016/0281412 A1* | 9/2016 | Leitmann | E06B 3/4636 |

FOREIGN PATENT DOCUMENTS

| | | |
|---|---|---|
| CN | 203633741 U | 6/2014 |
| CN | 203784582 U | 8/2014 |
| FR | 2801369 A1 | 12/2001 |
| GB | 2045707 A | 11/1980 |

* cited by examiner

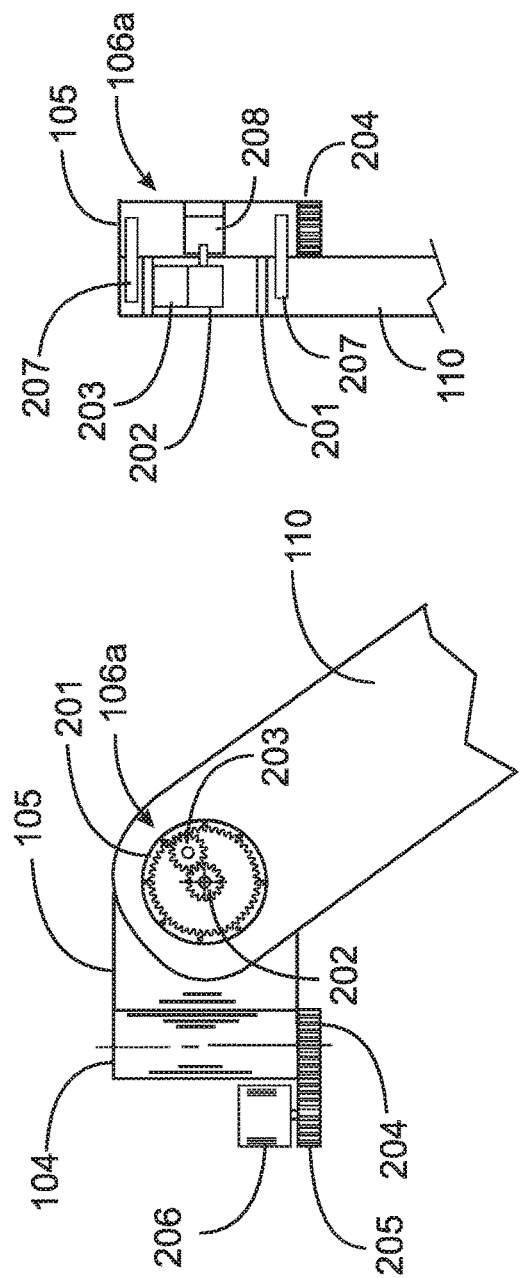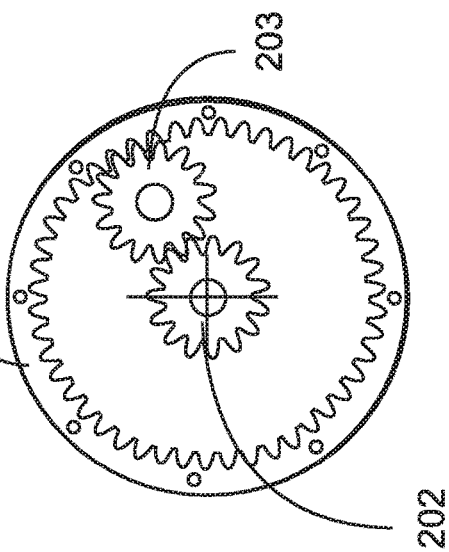
Fig. 2A
Fig. 2B
Fig. 2C

METHOD AND APPARATUS FOR ARTICULATED STORAGE

CROSS-REFERENCE TO RELATED APPLICATIONS

TBD

BACKGROUND OF THE INVENTION

1. Field of the Invention

The present invention is in the technical area of storage of articles and objects, and pertains more particularly to a mechanized system for presenting storage apparatus to users at different extensions and heights.

2. Description of Related Art

The need for storage of objects is notoriously well known. An example is presence in residence structures of closets, kitchen cabinets, and wall hooks and the like for hanging up things like hats and coat.

A big problem with storage apparatus in the current art is that the apparatus is often not accessible to some potential users. The problem many people have with reaching dishes on upper shelves of kitchen cabinets, as a single example, is well known. Some tall persons have no problem, but persons of lesser stature must often find a stool or a tool of some sort.

The problem of reaching articles stored at some height is particularly acute for disabled persons. A person in a wheel chair, for example, has a particularly serious problem with kitchen cabinets, and may have to keep his dishes in a low cabinet or other storage container.

What is clearly needed is a system of storage that is mechanically enabled to be extended and moved to accommodate the needs of persons of perhaps substantially different abilities, and operable by the different persons.

BRIEF SUMMARY OF THE INVENTION

In one embodiment of the invention an articulated storage apparatus is provided, comprising a mounting plate having openings for fasteners to mount to a stable stationary surface, a first arm extending from the mounting plate, a second arm coupled at a first end to the first arm at an end away from the carrier plate by a first vertically-oriented rotation mechanism driven by a first electric motor, a carrier plate having openings for fasteners to mount to a storage container, a third arm extending from the carrier plate coupled at an end away from the carrier plate to the second arm at a second end opposite the first end by a second vertically-oriented rotation mechanism driven by a second electric motor, and a control system having independent drivers for the first and the second electric motors, with inputs for independently rotating the electric motors in opposite directions.

In one embodiment the apparatus further comprises a first vertical axis mechanism driven by a third electric motor having an independent driver in the control system, the vertical axis mechanism mounting the first arm to the mounting plate such that the first arm swings in a horizontal arc with activation of the third electric motor. Also, in one embodiment the apparatus further comprises a fourth arm coupled at a first end to the second end of the second arm by a third vertically-oriented rotation mechanism driven by a third electric motor, and at a second end by the second vertically-oriented rotation mechanism to the third arm extending from the carrier plate. In one embodiment the apparatus further comprises a second vertical axis mechanism driven by a fifth electric motor having an independent driver in the control system, the second vertical axis mechanism mounting the third arm to the carrier plate such that the carrier plate swings in a horizontal arc with activation of the fifth electric motor. And in one embodiment the apparatus further comprises a central processing unit (CPU) in the control system, coupled to a data repository, executing software from a non-transitory medium, execution of the software enabling command inputs to drive motors to position the apparatus in a pre-programmed position.

In one embodiment a plurality of positions are pre-programmed and may be assumed in response to specific input commands. Also, in one embodiment the apparatus further comprises a remote control device with wireless communication capability and wireless communication circuitry in the control system compatible with the wireless capability of the remote control device, the remote control device having input mechanisms enabling a user to control the motors of the articulated storage apparatus. Also, in one embodiment the remote control apparatus is a device with a touch screen, presenting an interactive interface enabling the user to select a pre-programmed position for the articulated storage apparatus, and to command the apparatus to assume the pre-programmed position. In one embodiment the apparatus further comprises touch screen inputs enabling the user to manually control the motors of the articulated storage apparatus. And in one embodiment the remote control apparatus presents an interactive interface enabling the user to pre-program positions for the articulated storage apparatus to assume.

In another aspect of the invention a storage method is provided, comprising securing a mounting plate by fasteners through openings to a stable stationary surface, coupling a first arm extending from the mounting plate to a second arm at a first end to the first arm at an end away from the carrier plate by a first vertically-oriented rotation mechanism driven by a first electric motor, coupling a third arm extending from a carrier plate having openings for fasteners to mount to a storage container, to the second arm by a second vertically-oriented rotation mechanism driven by a second electric motor, and connecting the electric motors to independent drivers in a control system having inputs commanding the independent drivers to drive the electric motors.

In one embodiment the method further comprises coupling the first arm to the mounting plate by a first vertical axis mechanism driven by a third electric motor having an independent driver in the control system, the vertical axis mechanism mounting the first arm to the mounting plate such that the first arm swings in a horizontal arc with activation of the third electric motor. Also in one embodiment the method further comprises coupling a fourth arm at a first end to the second end of the second arm by a third vertically-oriented rotation mechanism driven by a third electric motor, and at a second end by the second vertically-oriented rotation mechanism to the third arm extending from the carrier plate. In one embodiment the method further comprises coupling a second vertical axis mechanism driven by a fifth electric motor having an independent driver in the control system, to the to the fourth arm and to the carrier plate such that the carrier plate swings in a horizontal arc with activation of the fifth electric motor. And in one embodiment the method further comprises implementing a central processing unit (CPU) in the control system, coupled to a data repository, and executing software from a non-transitory medium, execution of the software enabling command inputs to drive motors to position the apparatus in a pre-programmed position.

In one embodiment the method comprises pre-programming a plurality of positions that may be assumed in response to specific input commands. Also in one embodiment the method further comprises coupling a remote control device with wireless communication capability with wireless communication circuitry in the control system, the remote control device having input mechanisms enabling a user to control the motors of the articulated storage apparatus. In one embodiment the remote control apparatus presents an interactive interface on a touch screen, enabling the user to select a pre-programmed position for the articulated storage apparatus, and to command the apparatus to assume the pre-programmed position. In one embodiment the remote control apparatus presents touch screen inputs enabling the user to manually control the motors of the articulated storage apparatus. And in one embodiment the remote control apparatus presents an interactive interface enabling the user to pre-program positions for the articulated storage apparatus to assume.

BRIEF DESCRIPTION OF THE SEVERAL VIEWS OF THE DRAWINGS

FIG. 2A is a side elevation view of a portion of the apparatus of FIG. 1.

FIG. 2B is a front elevation view of the portion illustrated in FIG. 2A.

FIG. 2C is an enlarged view of a gear train of FIG. 2A.

DETAILED DESCRIPTION OF THE INVENTION

Figure 1A:
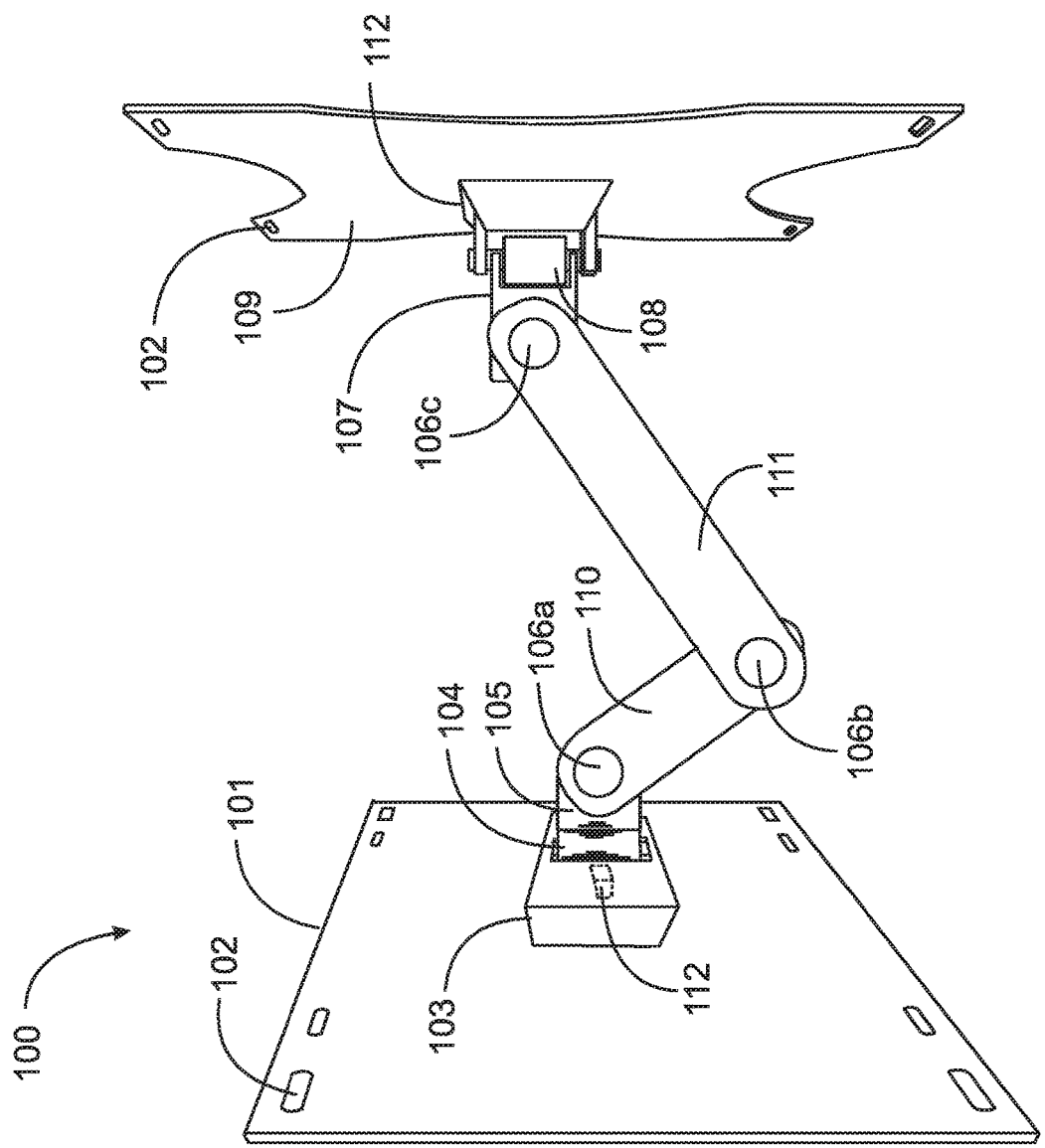
FIG. 1A is a side elevation perspective view of an articulated storage apparatus in an embodiment of the invention.

FIG. 1A is a side elevation perspective view of an articulated storage apparatus 100 in an embodiment of the invention. Apparatus 100 has a wall-mounting plate 101 with a plurality of openings 102 by which plate 101 may be fastened to a wall or other surface with conventional fasteners. A mechanism and control box 103 has a processor 112 and control circuitry implemented to control manipulation of the apparatus in use.

A short extension arm 105 extending from box 103 is mounted on a vertical axis mechanism 104, and may be rotated left and right to swing arm 105 to the left and right around the vertical axis by a first motor (not shown) and drive located in box 103. Specific teachings on the motors will be provided later in this specification. Arm 105 is coupled to a vertically oriented rotation mechanism 106a that couples arm 105 to an arm 110, and a second motor in a second mechanism 106a may be activated in either rotary direction to rotate arm 110 about mechanism 106a, either upward or downward.

A second rotation mechanism 106b is implemented on arm 110 at an end of the arm away from arm 105, and this second rotation mechanism couples arm 110 to arm 111. Activating this second rotation mechanism 106b rotates arm 111 up and down relative to arm 110. A third rotation mechanism 106c couples arm 111 on the furthest end away from plate 101 to a short arm 107 which mounts on a vertical axis mechanism 108 to a bracket 112 that is mounted to a carrier plate 109 that also has holes 102 for fastening to a box, cabinet or other carrier, container or rack device.

Figure 1B:
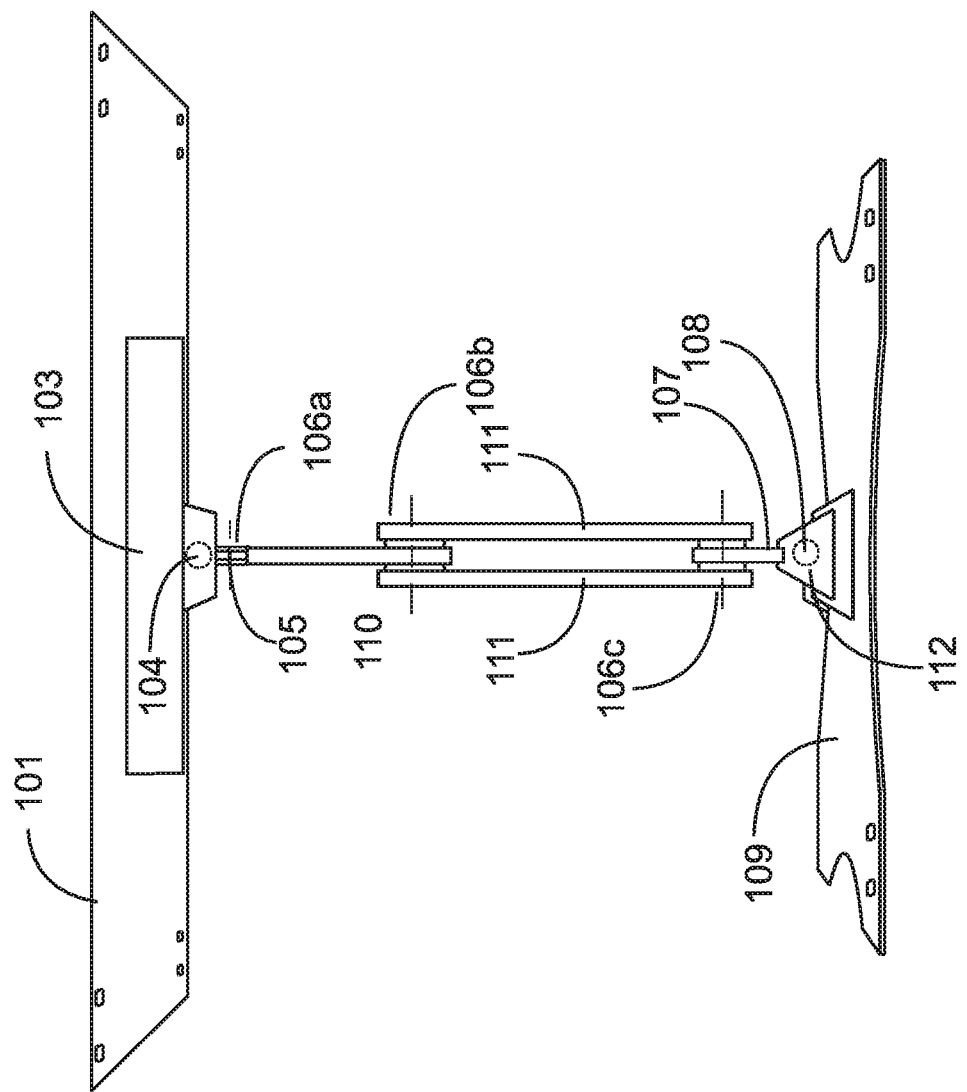
FIG. 1B is a plan view from above of the articulated storage apparatus of FIG. 1A.

FIG. 1B is a plan view from above of the articulated storage apparatus of FIG. 1A, with common parts indicated by element numbers. Of particular note is that arm 111 is a dual arm with side-by-side elements as seen in FIG. 1B, but does not show in FIG. 1A.

FIG. 2A is a side elevation view showing some exemplary details of rotation mechanism 106a coupling short arm 105 to extended arm 110. It should be noted that FIG. 2A is substantially diagrammatical, and does not follow standard section drawing practice. The purpose is to illustrate in a general way how relative motion between elements may be implemented. It may also be noted that rotation mechanisms 106b and 106c may be implemented as shown for rotation mechanism 106a, but may also be implemented differently.

Short arm 105 extends from a vertical axis mechanism 104, as described above, and has a gear 204 centered on the axis that is driven by a gear 205 on a shaft of an electric motor 206, that in one embodiment may be a digitally-driven stepper motor. A stepper motor enables a control function that runs the motor in steps and keeps track of the position of motor-driven elements by the number of steps from a home position. Running motor 206 in one rotary direction causes arm 105 to swing to the left, and in the other direction to swing to the right. As all of the apparatus supported by wall-mounting plate 101 depends from arm 105, all of the apparatus will swing to the left and right with arm 105.

Arm 110 couples to arm 105 by a rotation mechanism 106a, which provides relative rotation of arm 110 with arm 105 through a motor-driven gear mechanism that comprises in this example a planetary gear 201 rigidly attached to arm 110. A gear 202 driven by a shaft of an electric motor 208 (see FIG. 2B) turns gear 202 which meshes with a floating gear 203 that drives planetary gear 201, and therefore rotates arm 110 relative to arm 105.

FIG. 2B shows arm 110 mounted to arm 105 by a bearing 207, and also motor 208 driving gear 202, which drives gear 203 and hence gear 201, which rotates arm 110 elative to arm 105. In this example motor 208 is also a stepping motor to provide precision in positioning and ability to record positions. Driving motor 208 in one rotary direction causes arm 110 to swing up, and in the other direction to swing down. It should be noted that FIG. 2B is also largely diagrammatical, and is meant to illustrate general position and function, which may be accomplished in other ways.

FIG. 2C is an enlarged view of the gear train shown in FIG. 2A. It may be seen that arm 111 couples to arm 110 with another rotation mechanism 106b which may be essentially the same as the rotation mechanism described above that couples arm 110 to arm 105. Arm 111 therefore may be moved relative to arm 110 just as arm 110 may be moved relative to arm 105. Further, arm 111 couples to arm 107 with another rotation mechanism 106c, and may be moved relative to arm 107. Finally, carrier plate 109 and arm 107 are joined by a vertical axis mechanism 108, which, in some embodiments may be driven by an electric motor like mechanism 104, to swing plate 109 around vertical axis mechanism 108.

It may be seen that the series of joints and mechanisms between the arms and plates of apparatus 100 may be used to provide a very broad range of positions of carrier plate 109 relative to carrier plate 101.

Figure 3:
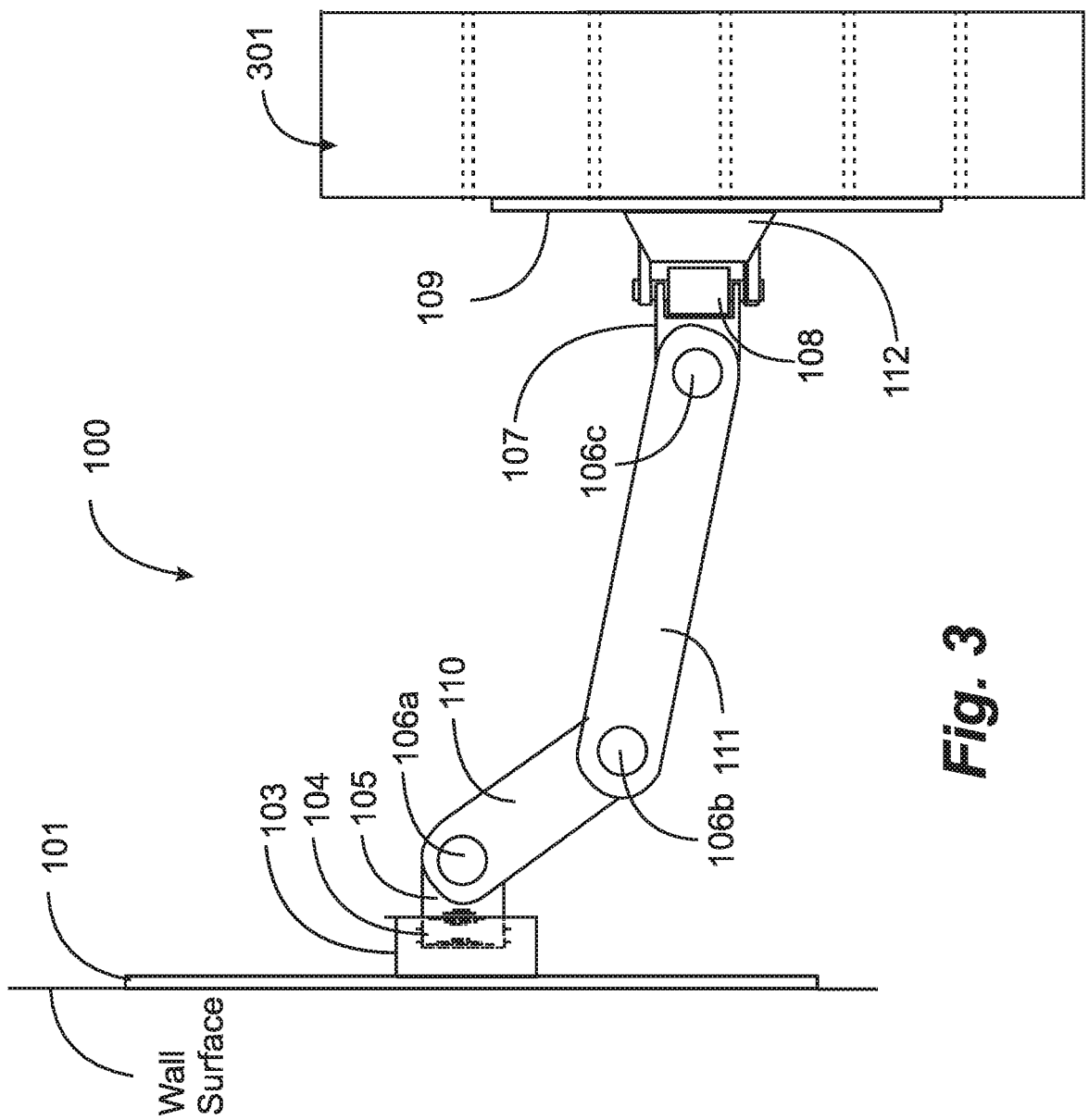
FIG. 3 is a side elevation view of the apparatus of FIG. 1.

FIG. 3 is a view of apparatus 100 of FIG. 1 wherein motors in various ones of the articulated joints have been manipulated to reposition carrier plate 109, now shown carrying a box 301, relative to wall-mounting plate 101. Arm 110 is shown in the same position that it is in FIG. 1, but rotation mechanism 106b between arm 110 and 111 has been rotated such that arm 111 is now extended in a different direction. Further rotation mechanism 106c between arm 111 and arm 107 has been rotated to compensate, and to keep plate 109 and therefore box 301 upright.

Figure 4:
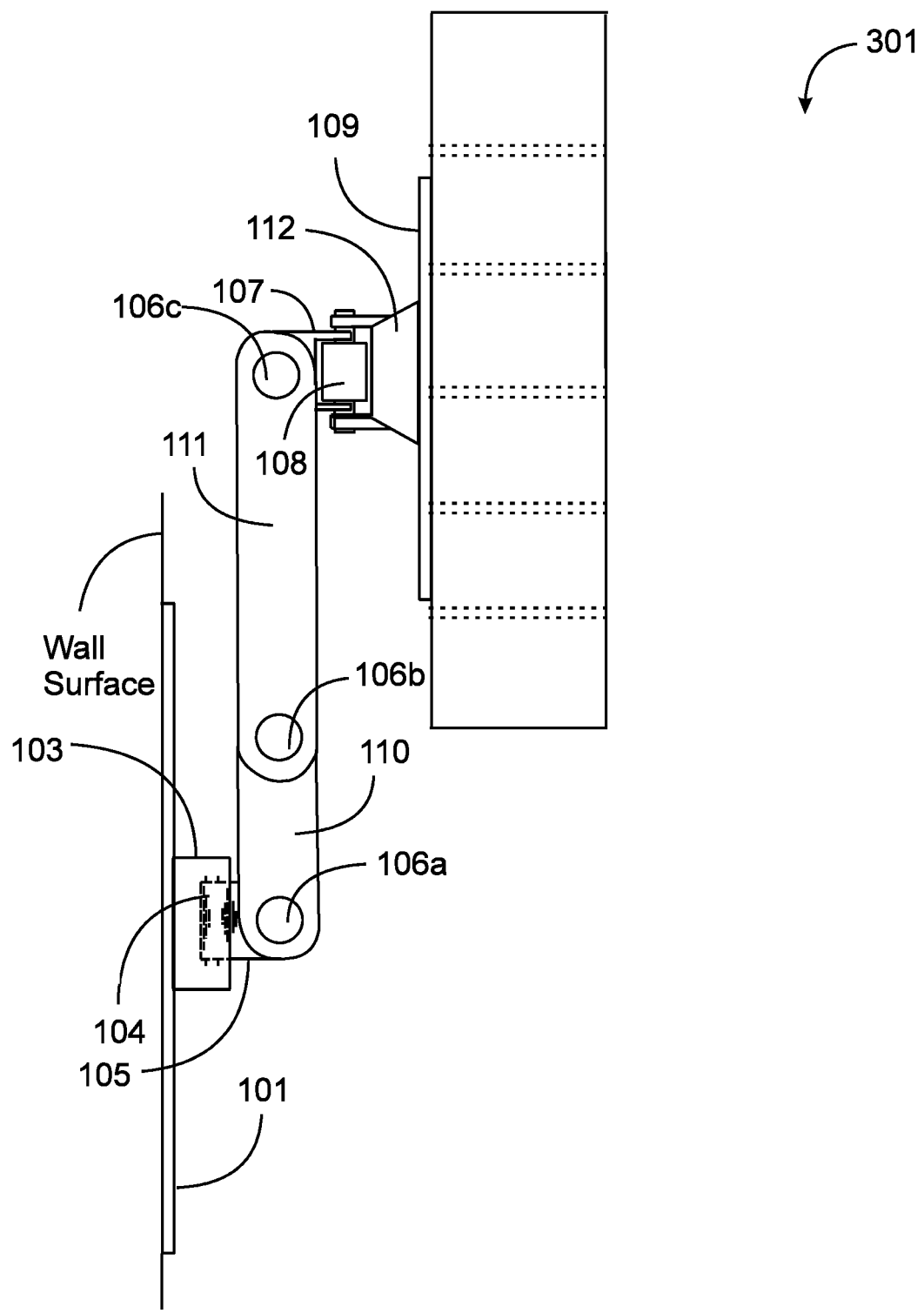
FIG. 4 is a side elevation view of the apparatus of FIG. 3 assuming an alternative position.

FIG. 4 illustrates a new position of arms such that arms 110 and 111 extend straight up, with box 301 still maintained upright. With the examples of FIGS. 1, 3 and 4 it should be apparent to the skilled person that an object carried by carrier plate 109 may be positioned in a great variety of positions, including rotation of vertical axis mechanisms 104 and 108 to present the arms and the carrier plate at different angles with horizontal.

As another example there may be several units of articulated storage apparatus 100, each carrying a kitchen cabinet, that in one upper position of the motors may be positioned side-by-side and elevated to a common height for such cabinets. The difficulty of accessing items in such cabinets is well known, for just about anyone, but even more so for a handicapped person. With an array of such apparatus carrying upper kitchen cabinets, and using an application on the remote device 512 individual ones of the cabinets may be lowered to a position more like that shown in FIG. 3, where access is easier. After accessing items in a cabinet, or loading other items, the cabinet may then be elevated to the common position.

In the circumstance of kitchen cabinets, there may be some limitations in the apparatus of the invention thus far described to particularly adapt the apparatus to manipulation of kitchen cabinets. Referring to FIG. 1A and FIG. 3 it may be seen that in the examples thus far described short arm 105 at the wall mounting plate, and short arm 107 at the carrier plate are fastened to the respective plates near the center of the plates. It may further be seen that arm 110 is shorter than arm 111.

Figure 5:
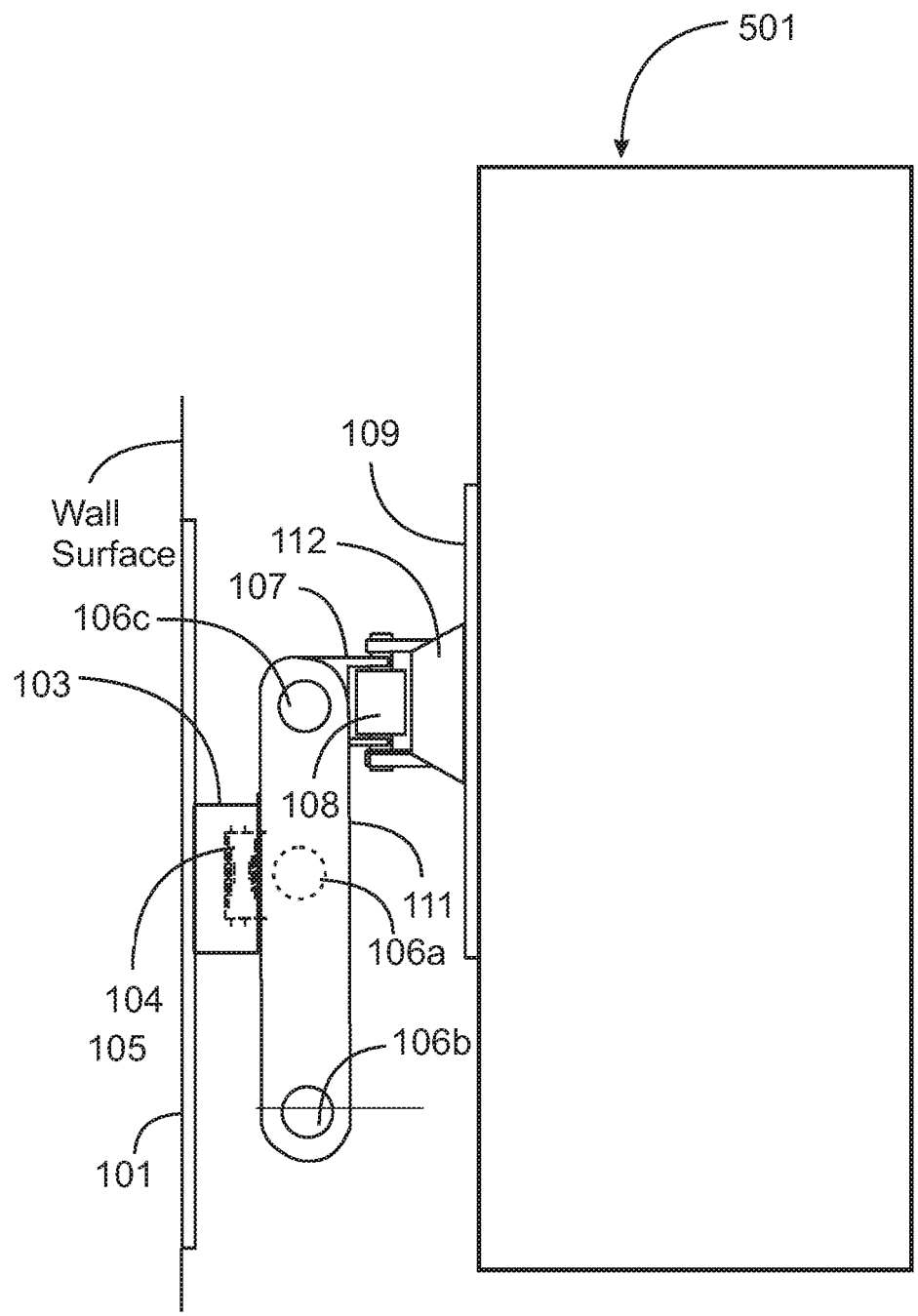
FIG. 5 is a diagram of control elements in an embodiment of the invention.

FIG. 5 is a side elevation view of the apparatus of FIGS. 1A and 3 wherein the apparatus is retracted to bring carrier plate 109 close to wall mounting plate 101. An upper kitchen cabinet 501 of a height substantially greater than the height of carrier plate 109 is shown mounted to carrier plate 109, such that the kitchen cabinet may be moved and positioned as described above. Because arm 110 is shorter than arm 111, carrier plate 111 in this circumstance is presented higher than wall mounting plate 101 in the retracted position. It may also be noted that the mechanisms of the articulated apparatus in this circumstance necessitate a gap between cabinet 501 and the wall. It is desirable that this gap be minimized, and this may be accomplished by dimensions of elements of the articulated apparatus, and in some circumstances the wall mounting plate may be recessed in the wall.

Figure 6:
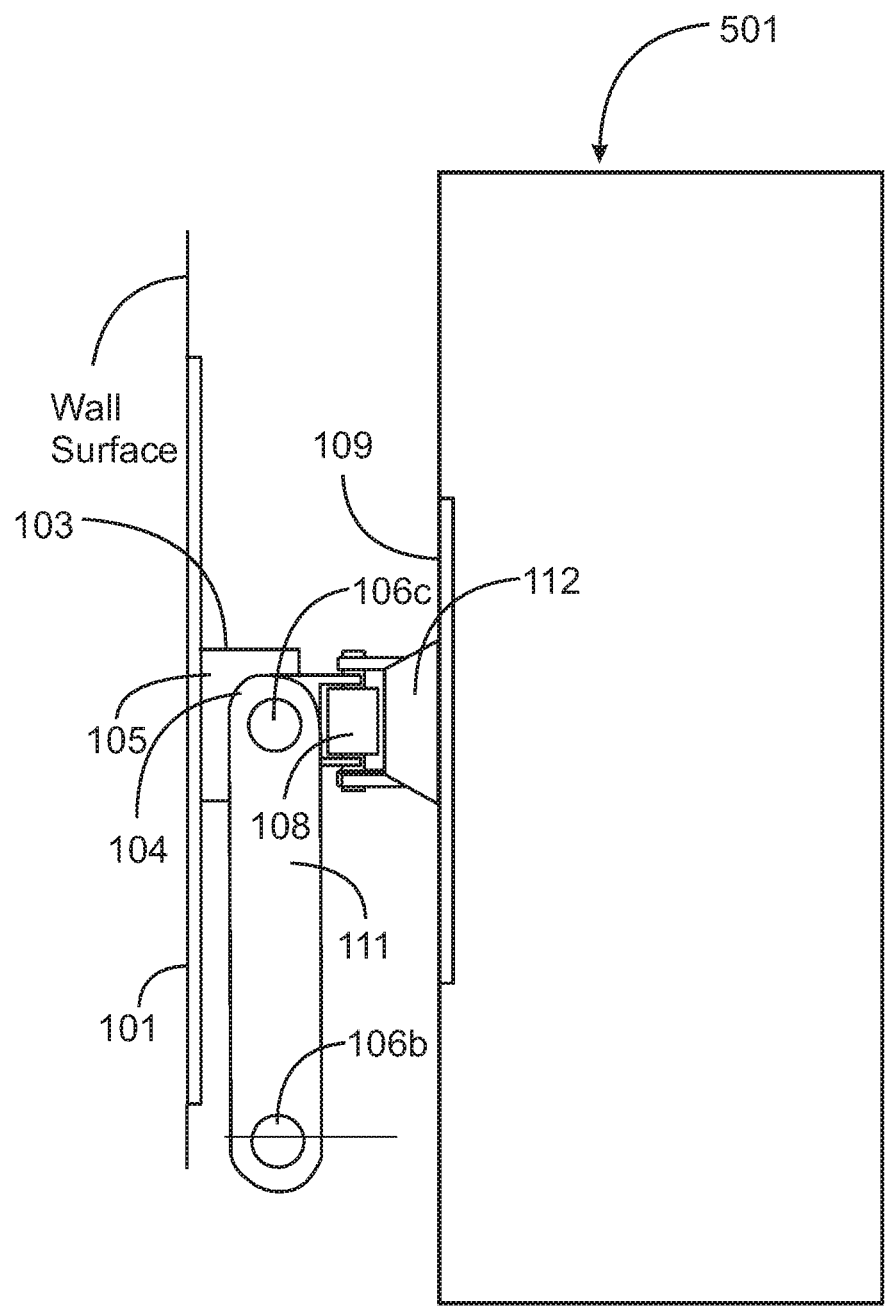
FIG. 6 illustrates a touch screen interactive interface in an embodiment of the invention.

FIG. 6 is a side elevation view of an articulated apparatus in an embodiment of the invention carrying a kitchen cabinet 501 with the apparatus fully retracted, wherein arms 110 and 111 are of the same length. It may be seen that in this circumstance that carrier plate 109 is at the same height (elevation) as wall mounting plate 101. In this example arm 110 has been folded down and arm 111 has been folded up. The reverse may also be true, that arm 110 may be folded up, and arm 111 folded down, and the same position would be achieved for cabinet 501.

Figure 7:
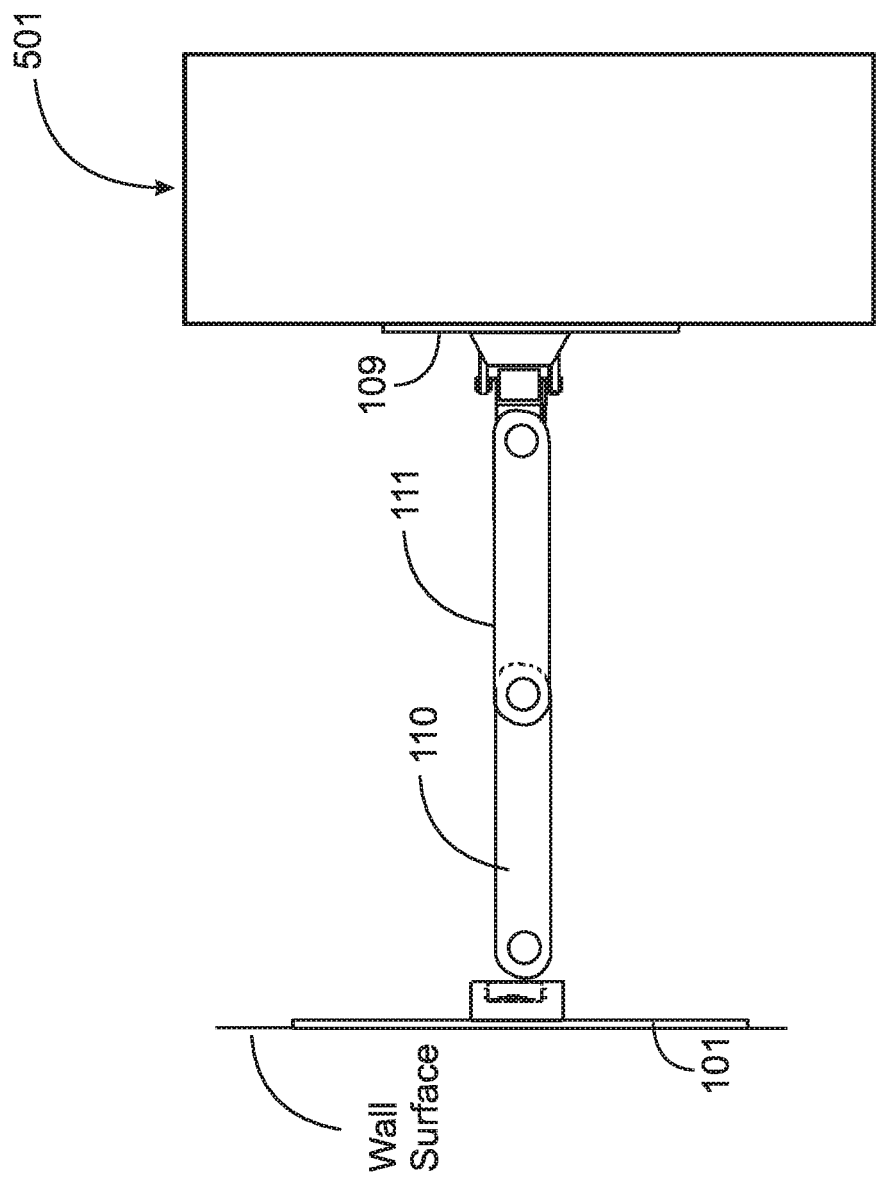
FIG. 7 is a side elevation view of the apparatus of FIGS. 1A and 3 wherein the apparatus is retracted to bring carrier plate close to a wall mounting plate.

FIG. 7 is a side elevation view of the apparatus and mounted cabinet of FIG. 6 with the apparatus fully extended to position cabinet 501 to a maximum dimension from wall mounting plate 101. It may be seen that in this state arms 110 and 111 are fully horizontal and aligned.

Figure 8:
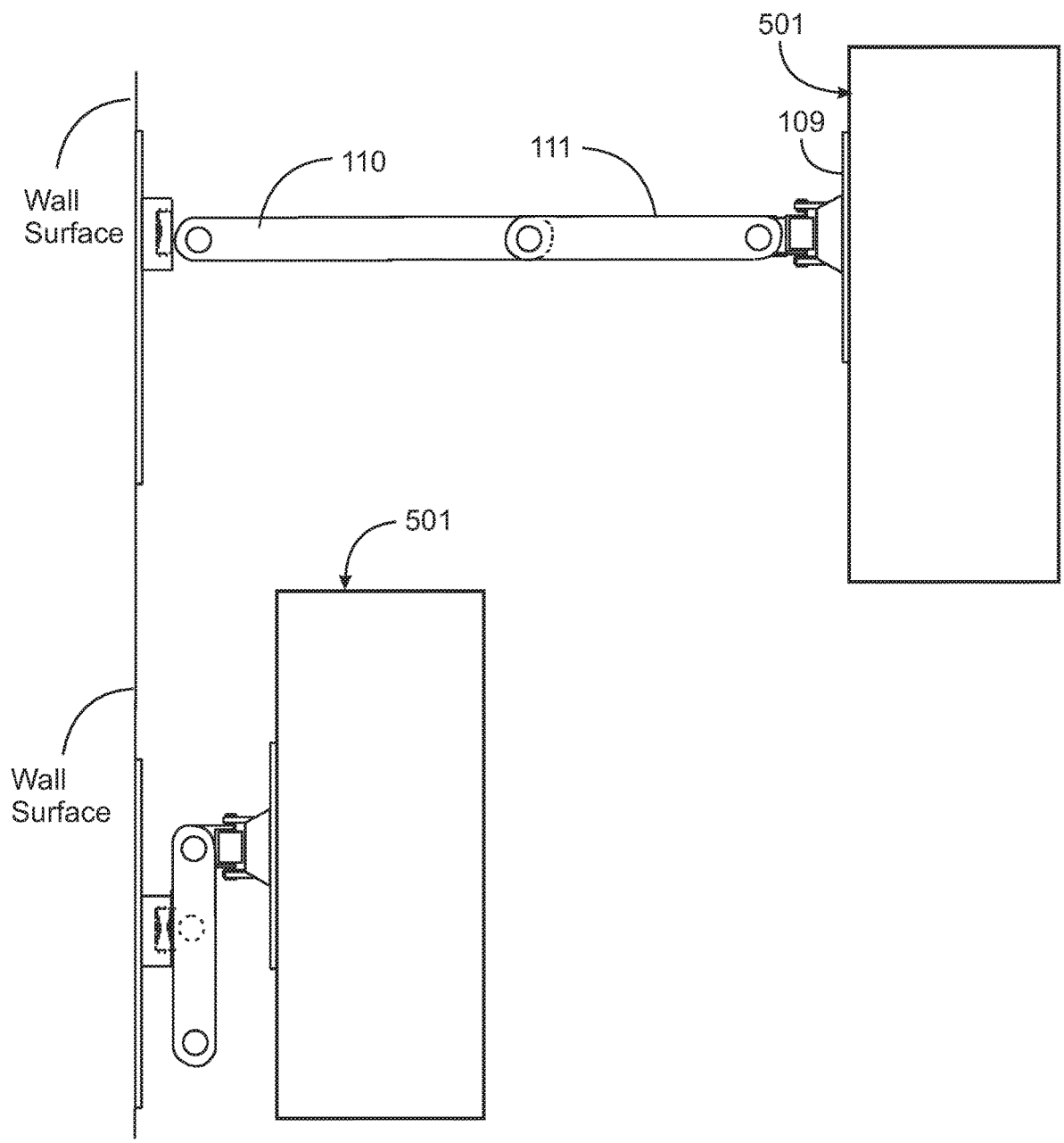
FIG. 8 is a side elevation view of two articulated apparatuses according to embodiments of the invention

FIG. 8 is a side elevation view of two articulated apparatuses according to embodiments of the invention, each apparatus mounted to a common wall, one cabinet above the other. The lower cabinet is in the fully retracted position at the wall, and the upper cabinet has been extended to its maximum dimension from the wall. The scale is reduced in this view so both cabinets and apparatus may be illustrated on the single page.

In FIG. 8 the length of arm 110 and 111 has been increased so that the rotation mechanism 106b between the two arms is beyond the outer edge of the lower cabinet when the upper cabinet is fully extended from the wall. Further, the mounting of arms 105 and 110 have been moved higher on wall plate 101 so there is ample room for the longer arms to fold down in retraction without interfering with the apparatus carrying the lower cabinet. As one with skill understands by viewing FIG. 8, upper cabinet 501 may extend past the lower cabinet enabling the cabinet to lower in front of the retracted lower cabinet. When both cabinets are in the retracted position, as close to the wall as possible, the cabinets would be positioned adjacent to each other. In this manner, someone who is short or in a wheel chair, for example, could actually lower a cabinet that has a second cabinet directly beneath and adjacent to it.

The skilled person, from the illustrations of FIG. 7 and FIG. 8 will understand that the implementation of elements of the articulated apparatus may vary considerably depending on the location of cabinets or other units to be carried and moved to different locations. In some circumstances a single arm may be adequate, in others two arms, and the lengths of the arms may be changed to accomplish intended functionality. In some circumstances there may be three or more arms connected in series, as well, to be able to move an object to a desired position. With the rotation mechanism 106b between arms 110 and 111 beyond the font edge of the lower cabinet, the upper cabinet may be lowered to a position in front of the lower cabinet.

Figure 9:
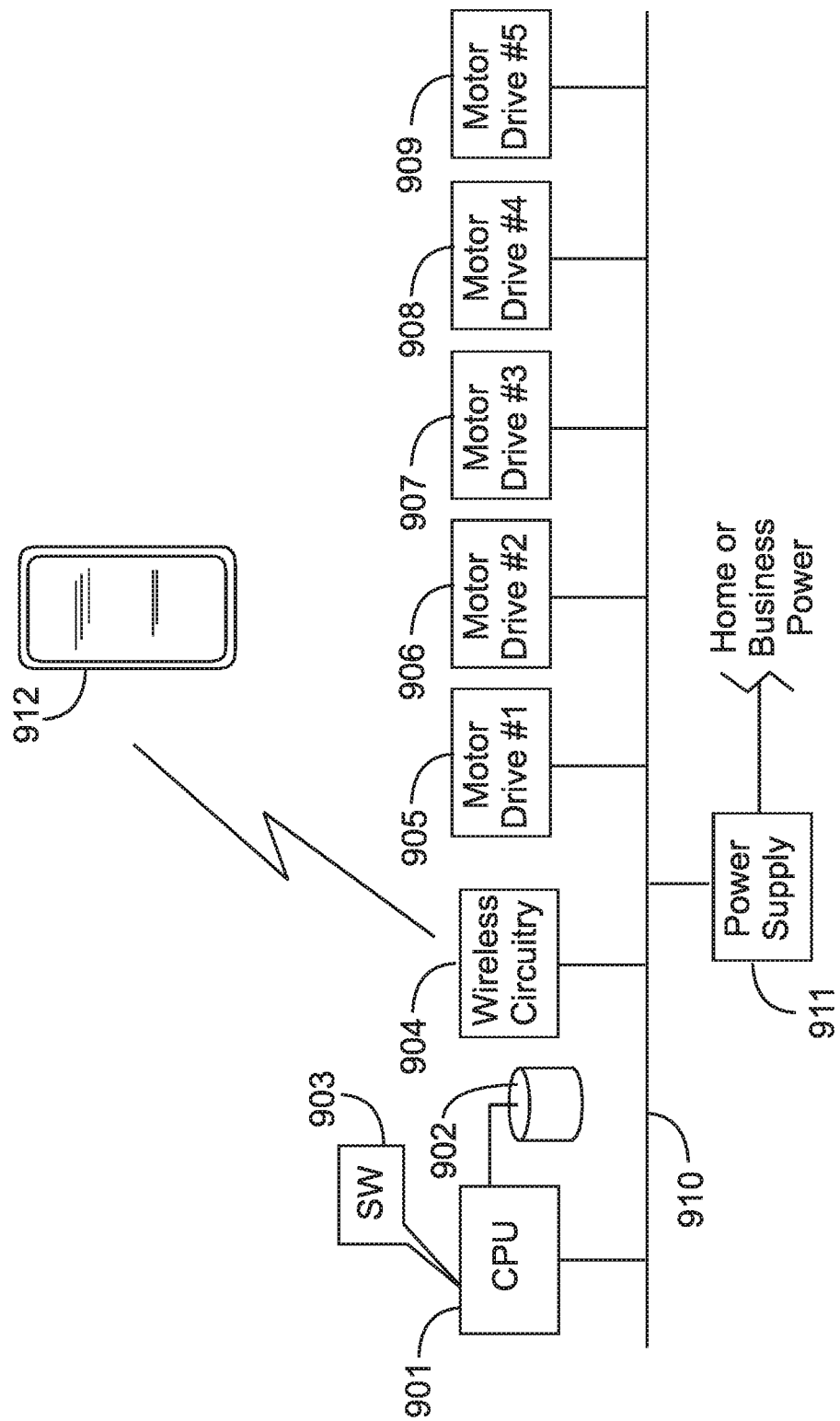
FIG. 9 is an exemplary circuitry diagram for apparatus in an embodiment of the invention.

FIG. 9 is an exemplary circuitry diagram for apparatus in an embodiment of the invention. In different use cases in implementations of the present invention the home and extended positions desirable for an apparatus will be very different. A process wherein a user may configure an apparatus according to the invention to a particular purpose may involve different processes in different embodiments.

Figure 11:
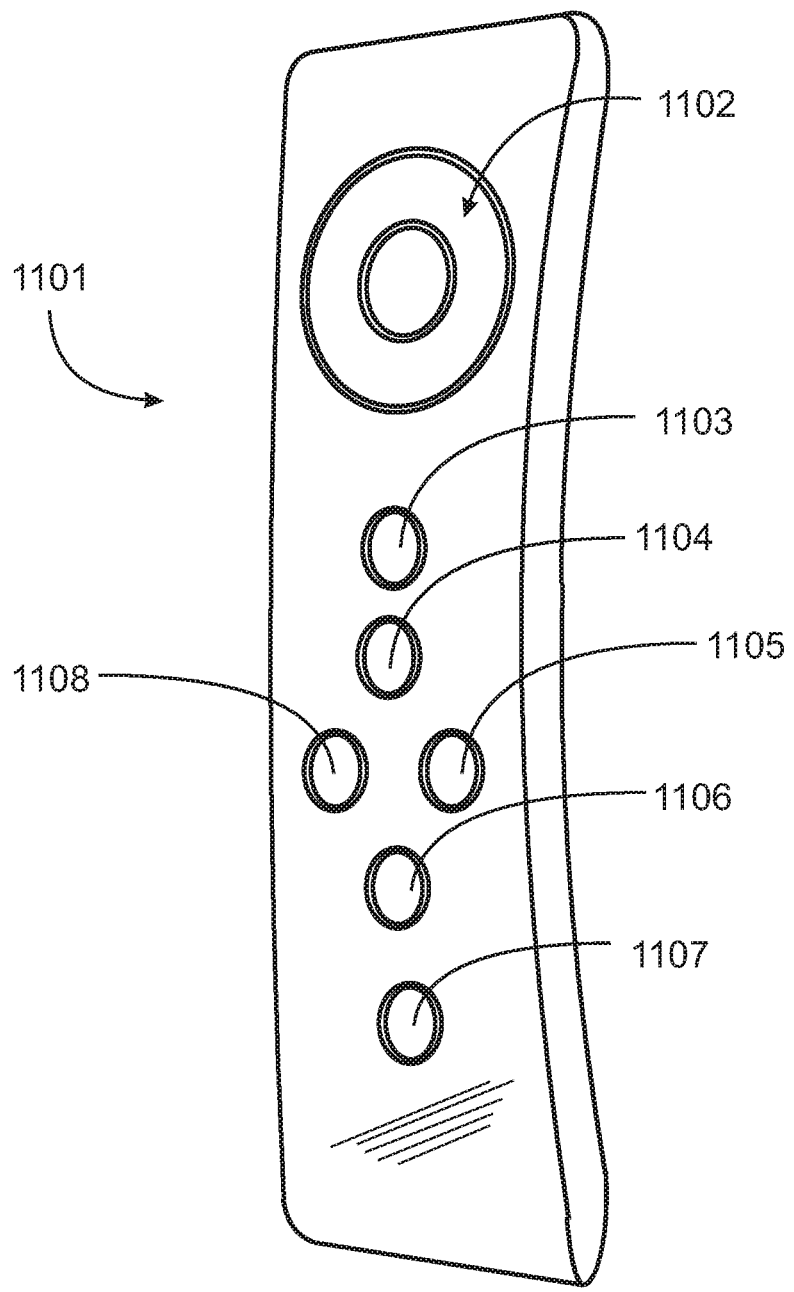
FIG. 11 is a perspective view of a proprietary remote control device in an embodiment of the invention.

There are essentially two different implementations regarding positioning. In a first implementation electric motors may be employed that may be started and stopped, but position for each moving element relative to another element is sensed by physical and optical sensors. In this implementation there may be a process for a user to adjust positions of the physical and optical sensors to provide input to the control system as to starting, stopping and homing operations. Once sensors are properly located, a version of SW 903 (FIG. 9) may be executed that accepts user input from a remote, such as a cellular telephone 912 executing a control app, or from a specialized remote controller, such as shown in FIG. 11. Different versions of SW 903 may be stored in data repository 902, and may be selectable in a configuration process for different implementations. The sensor implemented versions are mostly applicable for narrow use cases, where different positions are closely related.

In an alternative implementation the motors in FIG. 9 are stepper motors, which are also known as step motor or stepping motor. These are brushless DC electric motors that divide a full rotation into a number of equal steps. The motor's position can then be commanded to move and hold at one of these steps without any position sensor for feedback (an open-loop controller), as long as the motor is carefully sized to the application in respect to torque and speed.

In stepper-motor implementation SW 903 commands individual motors to take a specific number of steps in one rotary direction, and to stop when the number of steps is accomplished. In some embodiments the stepper motors feedback step positions to CPU 901. Data is stored in repository 902, and CPU 901 keeps track of positions of each stepper motor. In one embodiment a version of SW 903 provides an interactive interface on a cell phone touch screen or iPad screen, for example, with which a user may select home and extended positions, and program the apparatus to operate in a specific way in response to inputs either from an interactive interface on a device having a touch-screen, or on a dedicated remote having push-button inputs.

A CPU 901, analogous to processor 112 in FIG. 1, which may be a microprocessor or a processor of another sort, may be implemented in control box 103, shown in FIG. 1 as mounted to wall plate 101. The CPU may be implemented at other locations as well, as long as communication with other digital elements is maintained. CPU 901 is coupled to a data repository 902, which may store software and data, including data for homing and controlling mechanized apparatus in embodiments of the present invention.

CPU 901 in various embodiments executes software (SW) 903 to accomplish manipulation of physical elements of the apparatus in embodiments of the invention. CPU 901 and other digital elements are connected through a bus system 910 which is meant to also represent power lines for powering the various elements of the invention, as well as control lines. Power may be, in different embodiments, provided by batteries, by plugging into a wall outlet, or both, or perhaps by being wired directly into the electrical system of a home or a business. In this example power is drawn from a home or a business.

The control system in embodiments of the invention also comprises wireless communication circuitry 904, which may be Bluetooth™ or another close proximity wireless protocol, enabling remote control from such as a cellular telephone 912 executing a control application providing interactive interfaces for a user. Some examples of such remote operation are provided below. In some embodiments element 912 may be a dedicated remote control device rather than a cellular or other portable device.

In this example there are five electric motors driving manipulation elements, represented in FIG. 9 by motors 905 through 909, labeled also motors #1 through #5. CPU 903, executing SW 903 under commands from device 912 issues commands to motors #1 through #5 to turn one rotary direction or the other to position apparatus as desired in use of the apparatus. Motor #1 may operate, for example, axis mechanism 104, at the wall plate, which has an effect of swinging arm 105, and all the apparatus attached directly or indirectly to arm 105, left or right in a horizontal arc. Motor #2 may operate, for example, to drive rotation apparatus 106a between arm 105 and arm 110, which will have an effect of raising or lowering all apparatus extended further in a vertical arc.

Motor #3 may operate rotation apparatus 106b between arm 110 and arm 111, which may raise and lower apparatus relative to a fixed position of arm 110. Motor #4 may operate rotation apparatus 106c between arm 111 and arm 107, and motor #5 may operate vertical axis mechanism 108 to swing carrier plate 109 left and right relative to am 107.

The skilled person will understand that the degrees of freedom provided by operation of the five electrical motors in either direction provide an ability to position any load or cargo attached to carrier plate 109 in a very substantial array of possible positions. In alternative embodiments carrier elements different than element 109 may be used, the elements specifically designed to carry a different object, such as, for example, a bicycle.

As a single example a user may fasten a carrier box such as box 301 to carrier plate 109, and the box may be used to store, for example, tools, or just about anything else a user may need to store. The box may be positioned by manipulating individual ones of motors #1 through #5 to a position as shown in FIG. 3 for the tools or other items to be placed in the box. Once placed, a remote control device such as device 912 may be used to cause the storage apparatus to assume the position shown in FIG. 4, where the storage box is elevated to a height perhaps near the ceiling of a garage or other building. The box is than out of the way and the area lower to the floor may be used for other purposes.

In one embodiment, the item to be raised and lowered is a cabinet in a kitchen, for example. Particularly, the control program may be set to maintain a "level" orientation of cabinets as they are raised and lowered in order to not knock over glassware or other items held within the cabinet.

Figure 10:
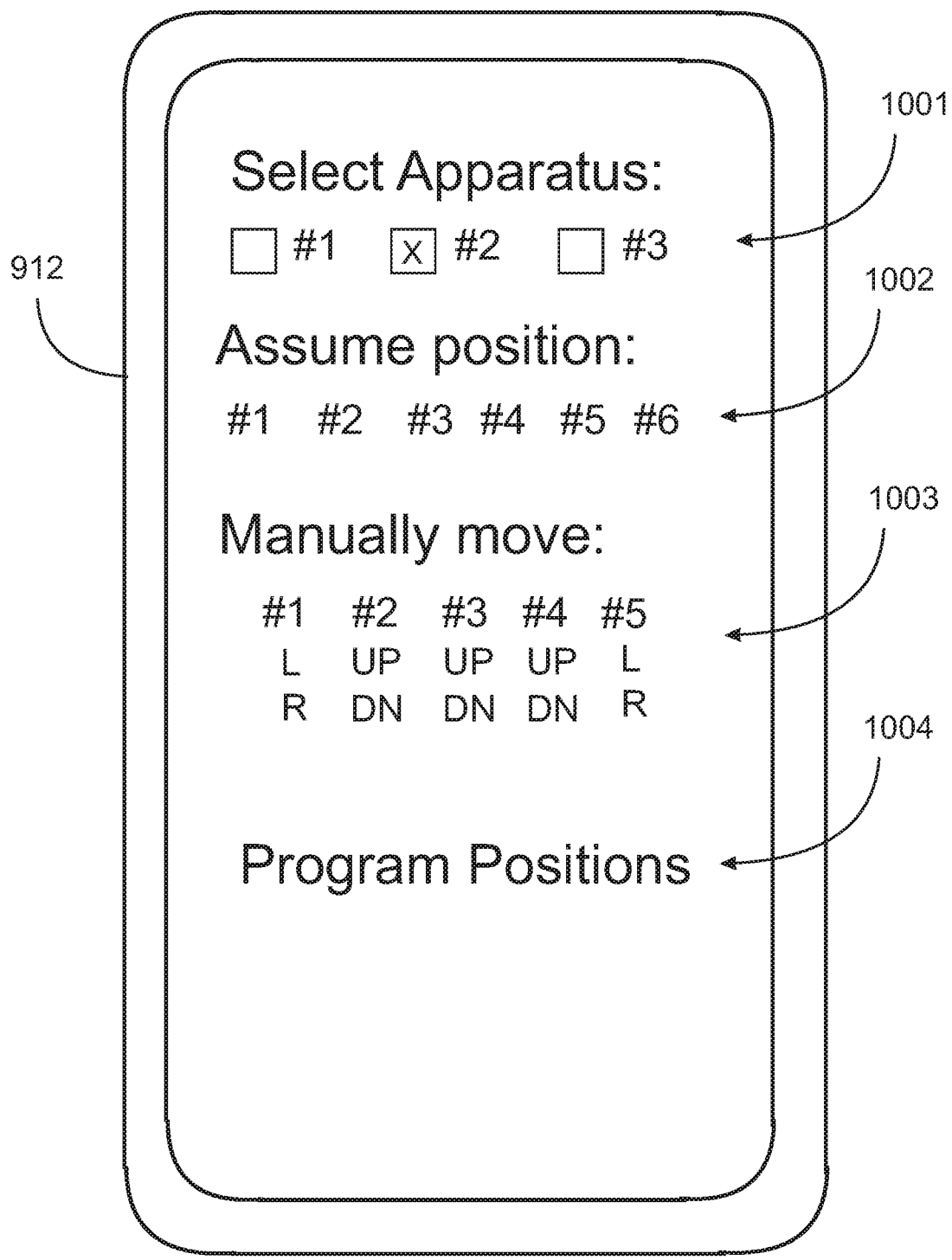
FIG. 10 is an example illustration of a single interactive interface displayed on a touch screen of a remote control device.

FIG. 10 is an illustration of a single interactive interface that might be displayed on a touch screen of smart phone 912, used to remotely control an apparatus according to an embodiment of the invention. In a top row 1001 of this exemplary interactive interface a user may select by a check box one of three different apparatuses. In many cases there will be only one apparatus in use, and the interface will not have this selection mechanism. In some circumstances there may be more than three, and the interface will have a check box for each. In row 1002 the user may command the apparatus checked in row 1001 to assume a pre-programmed position. As an example, refer to FIGS. 3 and 4. A user may program the lower position of FIG. 3 as position #1 and the upper position of FIG. 3 as position #2. Selecting position #1 or position #2 in row 1002 will cause the selected apparatus to assume the selected position. The apparatus will, of course, transition to a new position at a pre-programmed speed of the motors. If more than one apparatus is checked in row 1001, each apparatus selected will assume the newly selected position.

Selections at 1003 enable the user to manually manipulate a selected apparatus by driving motors left, right or up or down. A user of the interactive interface may configure application software that creates the interface to any orientation or configuration of apparatuses to be controlled. The user may add, remove or rearrange icons that represent individual apparatuses.

It will be apparent to the skilled person that apparatus 100 described with reference to figures above is but one of a substantial plurality of apparatus that might be provided in embodiments of the present invention. There may be a different number of motors in different apparatus performing different functions, and there may be specific interactive interfaces for control of different apparatus.

The "Program Positions" selection (a link) in the interface of FIG. 10 directs the user to another interactive interface that enables the user to program and name specific positions for an apparatus to assume by command.

FIG. 11 is a perspective view of a proprietary remote control device 1101 that may be provided in embodiments of the invention to control the associated articulated apparatus. Device 1101 may pair with control processor 901 in the same way described above for a smart phone. Alternatively the remote may signal by light signals, to be interpreted and acted upon by SW executing in processor 901.

As an example of such a remote, there may be a four-way selector and controller 1102, which may signal for up, down, left and right. Individual buttons 11-03 through 1108 may be associated with particular motors, and depressing a button will drive that motor in a pre-understood direction. As a single example, buttons 1108 and 1105 may control individually each of the vertical axis mechanisms. Each may be a toggle, switching from up to down of vice versa with each activation. Buttons 1103 through 1107 may control motors in rotation mechanisms between arms.

The skilled person will understand that all of the embodiments and variations described above are entirely exemplary, and not limiting. There may be many different implementations of apparatus in different embodiments and many different interactive interfaces in remote control apparatus, including smart phones or tablets, for a variety of purposes. Different apparatus may have different numbers of arms, and lengths of arms, among other differences within the scope of the invention. The invention is limited only by the claims that follow.

I claim:

1. An articulated storage apparatus, comprising:
    a mounting plate having openings for fasteners to mount to a stable stationary surface;
    a vertical axis mechanism, containing a first gear assembly and a first electric motor, mounting a first arm to the mounting plate;
    a second arm coupled at a first end to the first arm at an end away from the mounting plate by a first vertically-oriented rotation mechanism containing a second gear assembly and driven by a second electric motor;
    a carrier plate having openings for fasteners to mount to a storage container;
    a third arm extending from the carrier plate coupled at an end away from the carrier plate to the second arm at a second end opposite the first end by a second vertically-oriented rotation mechanism containing a third gear assembly and driven by a third electric motor; and
    a control system having independent drivers for the first, the second and the third electric motors, with inputs for independently rotating the electric motors in opposite directions, wherein the first gear assembly translates the first arm in a horizontal arc with activation of the first electric motor, and the second and the third gear assemblies extend and retract the second and the third arms and translate the second and the third arms along a vertical arc with activation of the second and the third electric motors.

2. The articulated storage apparatus of claim 1 further comprising a fourth arm coupled at a first end to the second end of the second arm by a third vertically-oriented rotation mechanism containing a fourth gear assembly and driven by a fourth electric motor having an independent driver in the control system, and at a second end by the second vertically-oriented rotation mechanism to the third arm extending from the carrier plate.

3. The articulated storage apparatus of claim 2 further comprising a second vertical axis mechanism driven by a fifth electric motor having an independent driver in the control system, the second vertical axis mechanism mounting the third arm to the carrier plate such that the carrier plate swings in a horizontal arc with activation of the fifth electric motor.

4. The articulated storage apparatus of claim 1 further comprising a central processing unit (CPU) in the control system, coupled to a data repository, executing software from a non-transitory medium, execution of the software enabling command inputs to drive motors to position the apparatus in a pre-programmed position.

5. The articulated storage apparatus of claim 4 wherein a plurality of positions are pre-programmed and may be assumed in response to specific input commands.

6. The articulated storage apparatus of claim 4 further comprising a remote control device with wireless communication capability and wireless communication circuitry in the control system compatible with the wireless capability of the remote control device, the remote control device having input mechanisms enabling a user to control the motors of the articulated storage apparatus.

7. The articulated storage apparatus of claim 6 wherein the remote control apparatus is a device with a touch screen, presenting an interactive interface enabling the user to select a pre-programmed position for the articulated storage apparatus, and to command the apparatus to assume the pre-programmed position.

8. The articulated storage apparatus of claim 7 further comprising touch screen inputs enabling the user to manually control the motors of the articulated storage apparatus.

9. The articulated storage apparatus of claim 7 wherein the remote control apparatus presents an interactive interface enabling the user to pre-program positions for the articulated storage apparatus to assume.

* * * * *